(12) United States Patent
Schlingmann et al.

(10) Patent No.: US 8,145,378 B2
(45) Date of Patent: Mar. 27, 2012

(54) COMMUNICATION SYSTEM FOR EXCHANGING DATA

(75) Inventors: Norbert Schlingmann, Beelen (DE); Reinhard Laing, Harsewinkel (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 432 days.

(21) Appl. No.: 12/475,633

(22) Filed: Jun. 1, 2009

(65) Prior Publication Data

US 2009/0299568 A1    Dec. 3, 2009

(30) Foreign Application Priority Data

Jun. 3, 2008 (DE) .................. 10 2008 026 452

(51) Int. Cl.
   *H04L 12/00* (2006.01)
(52) U.S. Cl. ............... 701/32.7; 701/29.1; 701/31.5; 701/33.4; 701/50; 370/401
(58) Field of Classification Search ............ 701/29–35, 701/50; 370/401, 402, 464, 466
See application file for complete search history.

(56) References Cited

U.S. PATENT DOCUMENTS

| 5,737,711 | A * | 4/1998 | Abe ............................ 701/29 |
| 6,418,324 | B1 * | 7/2002 | Doviak et al. ............ 455/426.1 |
| 6,803,854 | B1 * | 10/2004 | Adams et al. ............... 340/531 |
| 6,941,208 | B2 * | 9/2005 | Mahoney et al. ............ 701/50 |
| 7,242,109 | B2 * | 7/2007 | Beeren ........................ 307/9.1 |
| 7,581,230 | B2 * | 8/2009 | Chen et al. ................. 719/328 |
| 2002/0116107 | A1 * | 8/2002 | Mahoney et al. ............ 701/50 |
| 2006/0187956 | A1 * | 8/2006 | Doviak et al. .............. 370/466 |
| 2006/0262087 | A1 * | 11/2006 | Hanson et al. .............. 345/156 |
| 2008/0228963 | A1 * | 9/2008 | Hironaka et al. ............ 710/36 |

FOREIGN PATENT DOCUMENTS

| DE | 195 41 816 | 5/1996 |
| DE | 198 49 810 | 5/2000 |

* cited by examiner

*Primary Examiner* — Paul N Dickson
*Assistant Examiner* — Timothy Wilhelm
(74) *Attorney, Agent, or Firm* — Michael J. Striker

(57) ABSTRACT

A communication system for exchanging data between data recipients and data generators provides the data exchange between stationary and/or mobile units and/or within a stationary or mobile unit, and has a communication network via which the data exchange takes place connects various communication media to one another, and at least one communication manager assigned to the communication network, so that the at least one communication manager identifies the communication route of a data record between the particular data generator and the associated data recipient independently of the communication medium.

11 Claims, 5 Drawing Sheets

COMMUNICATION SYSTEM FOR EXCHANGING DATA

CROSS-REFERENCE TO RELATED APPLICATION

The invention described and claimed hereinbelow is also described in German Patent Application DE 10 2008 026 452.0 filed on Jun. 3, 2008. This German Patent Application, whose subject matter is incorporated here by reference, provides the basis for a claim of priority of invention under 35 U.S.C. 119(a)-(d).

BACKGROUND OF THE INVENTION

The present invention relates to a communication system for exchanging data between data recipients and data generators.

Today, vehicles such as agricultural working machines include a large number of electronic monitoring devices which exchange data via an internal bus system, or which exchange data with external communication devices via this bus system. Among many other things, an essential purpose of this data exchange is to monitor and control the mode of operation of the particular vehicle and its working units, and to ensure that highly diverse monitoring functions are performed properly. In the agricultural application, particular significance is attributed to ensuring that the settings for the operating parameters of the working units of an agricultural working machine are optimal, and, in particular, to monitoring the service life of components of the vehicle.

Depending on the configuration of the data generation and transmission systems, sensor systems internal to the machine detect operating states of the vehicle and its working units. These operating states are compared in internal or external data processing devices with characteristic curves and/or defined operating states which are stored therein; results data are generated which are then used to optimize various parameters of the vehicle and its working units. In this context it is also known to monitor the service life of certain working units and their components using internal or external diagnostic systems, and, depending on the structure of the diagnostic system, to identify any disturbances that occurred and identify their causes, or to diagnose information about the remaining services lives of components.

The numerous monitoring and control functions described above are typically carried out by control devices which, depending on the design stage and development status, include software modules which must be updated regularly. With regard for adjusting operating parameters in a manner that is controlled via characteristic curves, this regular updating is carried out because the particular control devices must be reprogrammed depending on crop material parameters and efficiency characteristic values of the agricultural working machine; in the simplest case, the reprogramming includes selecting a characteristic curve which is stored in a data processing device, and which then adapts the functionality of the particular control device to the new basic conditions. In every case, it is necessary for the data exchange to take place between the appropriate control devices and data processing devices, and in the correct direction.

From the prior art, e.g. DE 198 49 810, it is known that flash memories for programming control devices are designed in such a manner that user access rights and serial numbers of control devices are stored in them. If a user wants to reprogram certain control devices, he must identify the particular control device by entering and verifying the access right and the serial number. Given that safety considerations are paramount in communications of this type, a specific communication route is determined by explicitly entering identification data and comparing it with identification data that are stored in the flash memory; via this communication route and in a next step, communication takes place between a control device and a data processing device which is designed, e.g. as a diagnostic device. Communication systems designed in this manner have the disadvantage in particular that an individual, e.g. the operator of the diagnostic device, must always first enter data in a communication medium, based on which communication may then take place. This slows the communication process, binds it to a certain communication medium, and makes it complex and expensive since it requires operator intervention.

DE 195 41 816 makes known a further communication system with which a diagnostic device may communicate with the control device of a vehicle. To ensure that the control device may communicate with the control devices of various vehicle types or models of a vehicle type, the diagnostic device is designed such that it may change its identity using software which is stored on a memory cassette, in a manner such that it may communicate with highly diverse types of control devices. Systems of this type have the disadvantage, however, that the particular application—in this case, the diagnostic device that is adapted specifically to the particular vehicle type and its control devices using software—must include very specific information about the control device to be diagnosed, the data communication route, and the type of communication medium. As a result, the use of the diagnostic system becomes that much more inflexible the fewer the number of vehicle-specific software packages is that are stored on the memory cassette. In addition, increasing the number of vehicle-specific data packets that are stored on the memory cassette increases the costs of the memory cassette considerably.

SUMMARY OF THE INVENTION

The object of the present invention, therefore, is to avoid the disadvantages of the related art described above and, in particular, to provide a communication system with which the communication routes and the size of the data records to be transmitted are optimized, thereby resulting in a communication system having universal applicability, and that is cost-effective and operates efficiently.

In keeping with these objects and with others which will become apparent hereinafter, one feature of the present invention resides, briefly stated, in a communication system for exchanging data between data recipients and data generators, comprising a communication network via which a data exchange takes place between stationary and/or mobile units and/or within a stationary or mobile unit, said communication network connecting various communication media to one another; at least one communication manager assigned to said communication network, and identifying a communication route of a data record between a particular data generator and an associated data recipient independently of a communication medium.

Given that, in the case of the communication system for exchanging data between data recipients and data generators, the communication network that enables the data exchange connects data transmission paths of various communication media to one another—at least one communication manager being assigned to the communication network, and the at least one communication manager identifying the communication route of a data record between the particular data generator and the associated data recipient independently of the communication medium—it is ensured that the communication routes and the size of the data records to be transmitted are optimized, thereby resulting in a communication system having universal applicability, and that is cost-effective and operates efficiently.

In an advantageous embodiment of the present invention, the data record(s) contain(s) information about the data generator, the data recipient, and the communication medium, and the information is readable by the communication manager; the communication manager transmits the data record to the correct data recipient and in the associated communication medium based on the information that was identified by the data generator. In this manner, it is ensured that the individual data record does not need to contain any information about the actual communication route, thereby reducing the quantity of data to be transmitted in the communication network; when the hardware configuration of the communication network is the same, this results in rapid transmission of the data records.

Given that the data generator becomes the data recipient, and that the data recipient becomes the data generator on the communication route of the particular data record, it is also ensured that the data transmission architecture is transparent, thereby also ensuring that the data exchange will be more efficient.

In an advantageous development of the present invention
a first data processing device, as the data generator, defines a "requests" data record and transmits it to the communication manager via the communication network
the communication manager transmits the data record via a network node of a further data processing device which is functioning as the data recipient, and a "response" data record is generated in the further data processing device
the further data processing device, as the data generator, transmits the "response" data record that was generated to the communication manager via the communication network, and
the communication manager transmits the "response" data record to the first data processing device which is now functioning as the data recipient. In this manner, the data exchange always takes place via a communication manager, thereby ensuring that none of the exchanged data records must contain information about the particular communication route, the communication medium, or the communication platform.

In an advantageous development of the present invention, the communication manager is assigned to a mobile unit designed as an agricultural working machine, the mobile unit including a CAN bus system; the communication manager controls the data exchange between data generators and data recipients within the CAN bus system, and between the CAN bus system and external data generators and data recipients. In this manner, it is ensured with regard for communication that takes place internal to or external to the machine that the data records to be exchanged do not need to contain information about the particular communication route, the communication medium, or the particular communication platform.

In an advantageous embodiment of the present invention, the data generators and data recipients that are assigned to the agricultural working machine and that are integrated in their CAN bus system are formed by control devices and/or at least one control and input device and/or at least one diagnostic system, and wherein it is possible to integrate external data generators and data recipients, preferably external diagnostic systems, in the CAN bus system. This has the advantage that the communication network may be used in a highly flexible manner, and it is not bound to certain agricultural working machines, their control devices, or to certain diagnostic systems.

Given that, in an advantageous embodiment of the present invention, the "requests" data record and the "response" data record in the communication network may travel along external communication routes and/or internal communication routes, that the internal communication routes include the communication routes within the control device, and that the external communication routes include the communication routes outside of this control device, it is ensured that the communication network according to the present invention may respond to data requests that are internal or external to the machine.

Depending on the complexity of the request, the communication system according to the present invention may be designed such that the "requests" data record is transmitted via the communication manager to one or more data recipients, and that the one or more data recipients generate(s) a "response" data record. In this manner, it is possible to create and exchange highly complex information in the communication network. In this context, it is also advantageous when the several data recipients that generate a "response" data record may be reached via a combination of internal and external communication routes, so that, e.g. information from a plurality of control devices may be combined into one single "response" data record, rather than existing as separate "response" data records.

In order to easily realize the data exchange according to the present invention in addition to the bus system-based control of a control device to implement its original control and regulating function, it is provided in an advantageous embodiment of the present invention that the at least one control device includes a software and hardware module which is directly connected to the CAN bus system via a first communication interface, and the control device includes at least one further communication interface that includes a communication manager, which makes it possible for data to be exchanged between the CAN bus system and a software module of the software and hardware module of the control device in a protocol standard, e.g. the keyword protocol standard, as the bypass of the first communication interface.

In a further advantageous embodiment of the present invention the software and hardware module of the control device includes an electronic control unit and/or an on-board diagnostics and calibration module and/or a teleservice module, wherein the communication manager enables the data exchange between them via internal communication routes and between these devices and further control devices and diagnostic modules on external communication routes. This communication architecture also results in an efficient exchange of data records in the communication system.

Furthermore, given that control and regulating characteristic curves for the particular control device are stored in an editable manner in the electronic control unit, and that malfunction information that relates to the control device may be called up from the electronic control unit, and that by using the on-board diagnostic and calibration module it is possible to request the malfunction information, to calibrate the control devices, and to change the control and regulating characteristic curves which are stored in the electronic control unit, and that data from one or more control devices may be requested periodically via the teleservice module, and that the request is carried out automatically by the teleservice module, the communication system according to the present invention is designed such that it may realize nearly any essential application of the data exchange between various units that are integrated in a bus system.

Further advantageous embodiments are the subject of further dependent claims and are described below with reference to exemplary embodiments shown in a plurality of figures.

DESCRIPTION OF THE PREFERRED EMBODIMENTS

Figure 1:
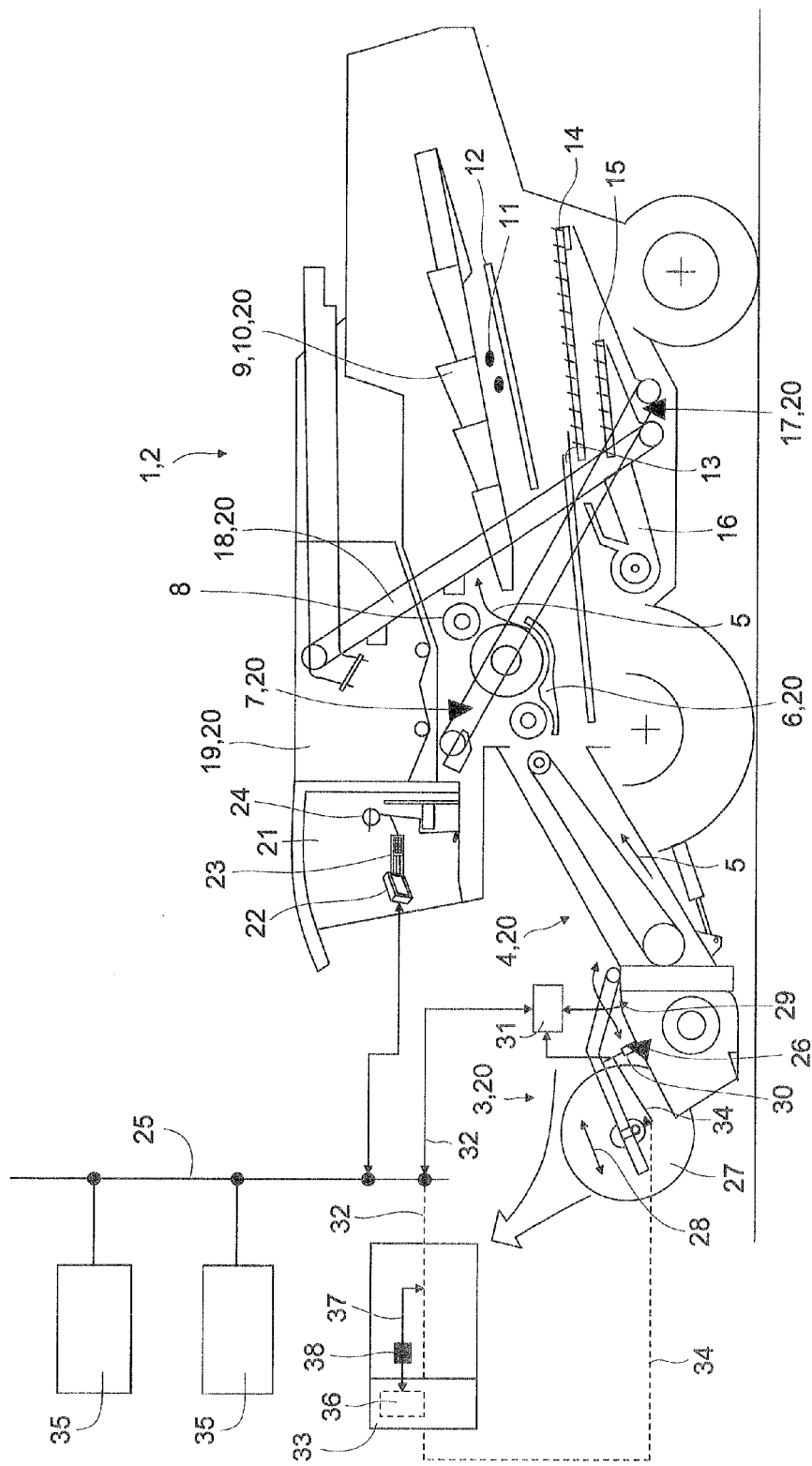
FIG. 1 shows an agricultural working machine designed as a combine harvester, which includes the communication system according to the present invention

Agricultural working machine 1 which is designed as a combine harvester 2 and is depicted schematically in FIG. 1 includes a grain-cutting device 2 in its front region, which is connected in a manner known per se to feed rake 4 of combine harvester 2. Crop material flow 5 that passes through feed rake 4 is transferred in upper, rear region of feed rake 4 to threshing devices 7 of combine harvester 2, which are at least partially enclosed on the bottom by concave 6. A guide drum 8 situated downstream of threshing devices 7 redirects material flow 5 in the rear region of threshing devices 7 after they exit threshing devices 7 in a manner such that it is transferred immediately to a separating device 10 which is designed as a tray-type shaker 9. Material flow 5 is conveyed on rotating tray-type shaker 9 in a manner such that any unencumbered grains 11 contained in the material flow are separated out in the region underneath tray-type shaker 9. Grains 11 that are separated out at concave 6 and on tray-type shaker 9 are directed via return pan 12 and feed pan 13 to a cleaning device 17 which is composed of several sieve levels 14, 15 and a fan 16. The cleaned flow of grain is then transferred via elevators 18 to a grain tank 19. Grain-cutting device 3, feed rake 4, threshing devices 7 and concave 6 assigned thereto, separating device 10, cleaning device 17, elevators 18, and grain tank 19 are referred to hereinbelow as working units 20 of agricultural working machine 1.

An agricultural working machine 1 that differs from combine harvester 2 depicted here may be any type of agricultural working machine, such as a forage harvester, tractors with attachments, hauling vehicles and the like; it includes a driver's cab 21 in which at least one control and regulating device 23 which includes a display device 22 is located, using which a large number of processes to be described in greater detail may be controlled, the processes being initiated automatically or by operator 24 of agricultural working machine 1. Control and regulating device 23 communicates via a bus system 25 with sensor systems 26 which will be described in greater detail.

For clarity, FIG. 1 shows, as an example, a sensor system 26 which is assigned to grain-cutting device 3; further sensor systems 26 and specific designs of sensor systems 26 are described in detail in the figures below, to the extent this is necessary. In a manner known per se, sensor system 26 which is assigned to grain-cutting device 3 may include various pressure and position sensors which make it possible to displace a reel 27 in arrow direction 28, or to swivel reel 27 in arrow direction 29 by applying pressure to or releasing pressure from one or more lifting cylinders 30. In order to control these functionalities, a control device 31 is assigned to sensor system 26. Control device 31 communicates with bus system 25 which is assigned to agricultural working machine 1 and is preferably designed as a CAN bus system, via a line system 32 or in a wireless manner. Control device 31 (shown in an enlarged view on the left side of FIG. 1) is configured in a manner such that it includes a first software and hardware module 33, in which the control and regulating processes of a specific application—the control of the position of reel 27 in this case—are stored. Software and hardware module 33 is connected directly to the actuators of working units 20, i.e. lifting cylinders 30 of grain-cutting device 3 in this case, thereby enabling control commands to be transmitted directly using software and hardware module 33 to actuators 30 of working units 20, and enabling signals to be received from particular sensor system 26. Software and hardware module 33 is connected via line system 32 directly to CAN bus system 25 of agricultural working machine 1, thereby enabling software and hardware module 33 to communicate directly with further data processing devices 35 that are integrated in bus system 25, and that may also be further control devices 31. It lies within the scope of the present invention for data processing devices 35 to be situated in agricultural working machine 1 or externally, in which case an external placement is understood to mean they are installed on further mobile or stationary deices which preferably communicate with bus system 25 of agricultural working machine 1 in a wireless manner.

In a manner according to the present invention, software module 36 of software and hardware module 33 includes a software-based and/or hardware-based communication interface 37 which makes it possible via a standardized protocol, e.g. a keyword protocol standard, for software and hardware module 33 to communicate with CAN bus system 25 of agricultural working machine 1 in the manner of a bypass. A communication manager 38 which will be described in greater detail below, and which is used to optimize the data transmission between CAN bus system 25 and software and hardware module 33 of control device 31 is integrated in communication interface 37.

Figure 2:
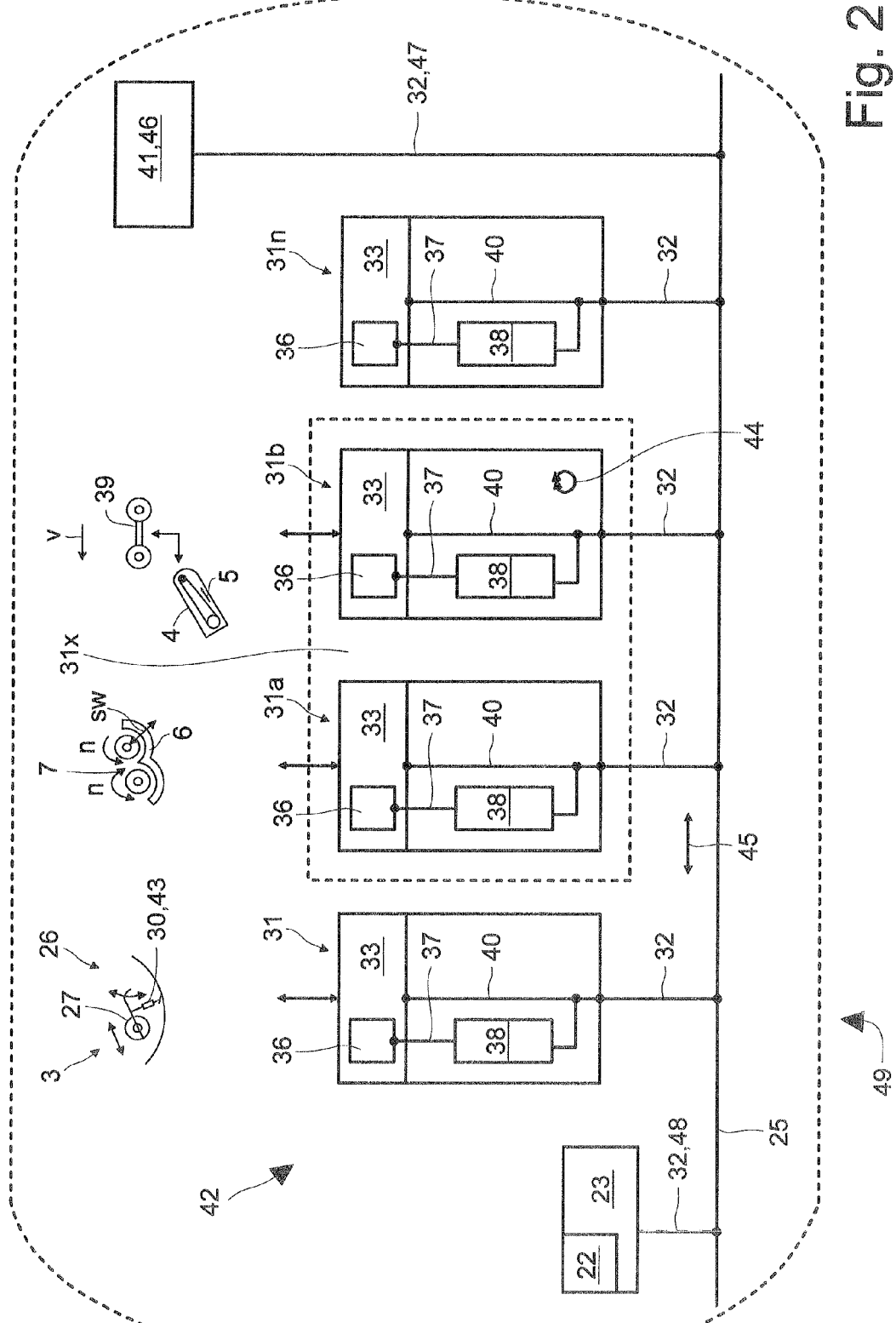
FIG. 2 shows a schematic, detailed view of the communication system in FIG. 1

FIG. 2 shows a schematic depiction of CAN bus system internal to the machine, to which a large number of control devices 31 according to the present invention are assigned, wherein only a selection of control devices 31 is described further in order to describe the present invention in greater detail. Control device 31 shown on the right corresponds to control device 31 described in FIG. 1 and which is used to control the position of reel 27 of grain-cutting device 3. Control device 31a is used to control rotational speed n or threshing devices 7, and to adjust gap width sw of concave 6. Control device 31b is used, e.g. to control the ground speed of combine harvester 2 as a function of the throughput rate, in the case of which crop material throughput 5 is determined in feed rake 4 using sensors which are known per se, and an optimal ground speed v is controlled at hydraulic ground drive 39 as a function of crop material throughput 5 that is determined, and as a function of the available engine power. It is within the scope of the present invention for these functionalities of control devices 31a-n to be combined into one single control device 31x. Every control device 31 includes software and hardware module 33 described above, software module 36 of which is coupled to CAN bus system 25 via a communication interface 37 which includes communication manager 38 according to the present invention, and an appropriate line system 32.

Every control device 31 also includes a further hardware- or software-based communication interface 40 via which particular software and hardware module 33 may communicate directly, i.e exchange data, with CAN bus system 25 via particular line system 32 or wirelessly, thereby bypassing communication interface 37 which includes communication manager 38. In addition, control and regulating device 23 which is assigned to agricultural working machine 1 and includes display device 22 is integrated in CAN bus system 25 of agricultural working machine 1 via a line system 32 or in a wireless manner. While control and regulating device 23 and various control devices 31 are situated inside the machine, it is also possible for external data processing device 41, preferably diagnostic systems 46 known per se, to be integrated in CAN bus system 25 of agricultural working machine 1, usually via wireless data transmission routes 32.

In this manner, a communication system 42 is obtained in which data may be exchanged between internal control devices 31 and control and regulating device 23, and/or between these devices and one or more external data processing devices 41. Regarding control devices 31, the communication and the related data exchange may take place directly between CAN bus system 25 and particular software and hardware module 33 via an appropriate communication interface 40. This communication route is typically used when data generated by the internal sensors should be transmitted to external systems, or when various working units 20 of agricultural working machine 1 should be operated according to control characteristic curves which are stored in control devices 31 and/or control and regulating device 23. In a manner according to the present invention, the data exchange between software and hardware modules 33 of control devices 31, control and regulating device 23, and one or more external data processing devices 41 may also take place via CAN bus system 25 and particular communication interface 37—which includes a communication manager 38—of control devices 31.

The communication route according to the present invention which includes communication manager 38 is typically used when a new version of control software, i.e. an update, for particular control device 31 should be transmitted to one or more control devices 31. In this case, the communication typically takes place between external data processing devices 41 and control devices 31 which are integrated in CAN bus system 25, and/or control and regulating device 23. A further essential field of application is the calibration of certain sensor systems 26 of agricultural working machine 1. In these cases, characteristic curves are defined based on detected parameters, which then describe the control function of a certain control device 31 or several control devices 31; in a preferred embodiment, the characteristic curves are stored directly in software and hardware modules 33 of control devices 31. A further application is the diagnosis of particular control device 31 itself, or the diagnosis of actuators 43 of working units 20, which are controlled by particular control device 31, and the diagnosis of assigned sensor systems 26, it being possible to use internal and/or external diagnostic systems 46 in this case. In this manner, a diagnostic function is provided that detects disturbances, malfunctions, and failures of working units 2 or the point in time when working units 20 are likely to fail.

FIG. 2 shows a schematic description of possible internal and external communication routes 44, 45 of communication system 42 according to the present invention. Arrow 44 is a symbolic representation of an internal communication route within a control device 31. Arrow 45 is a symbolic representation of an external communication route between control devices 31, control and regulating device 23 and external data processing devices 41. It is within the scope of the present invention for the communication according to the present invention to include only internal or external communication routes 44, 45, or a combination of both communication routes 44, 45. Given that the exchange of data between control devices 31, control and regulating device 23, and external data processing devices 41 takes place via wireless data transmission routes 47, or via line-based data transmission routes 48, such as line systems 32, internal bus system 25, and various communication interfaces 37, 40 of control devices 31, a communication network 49 composed of various communication media, i.e. line-based and wireless communication media, is created.

Figure 3:
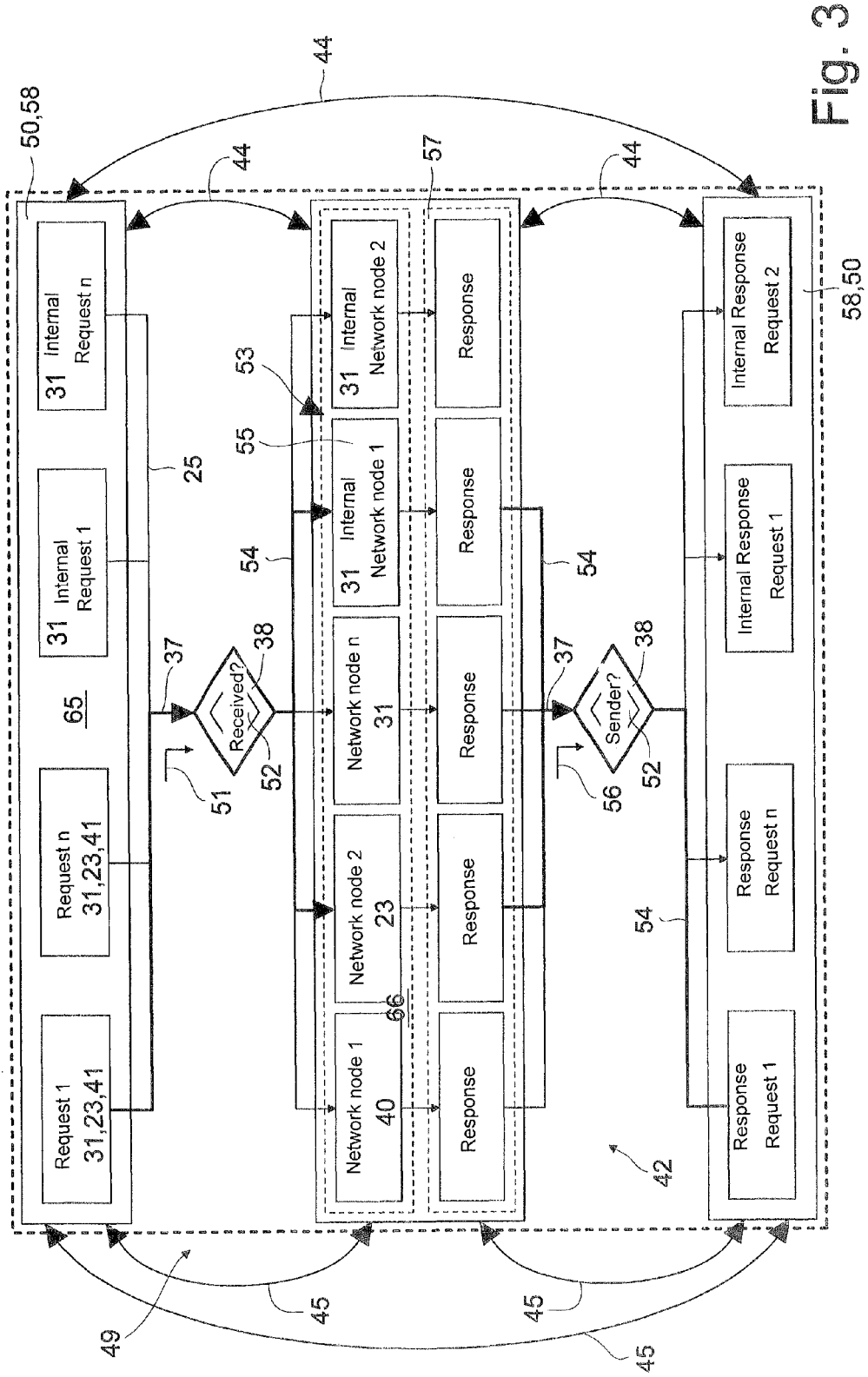
FIG. 3 shows a schematic view of the data exchange in the communication system in FIG. 2

FIG. 3 is a schematic depiction of the communication process in communication network 49—according to the present invention—of a communication system 42. Control devices 31 described above, control and regulating device 23, and one or more external data processing devices 41 are used as data generators 50 in a first communication step. Internal and/or external requirements are generated depending on whether particular data generator 50 uses only internal or external communication routes 44, 45 or a combination of communication routes 44, 45. These internal and/or external requirements are coded in a "requests" data record 51, and they are transmitted in the manner described above via a line system 32 or wirelessly to internal CAN bus system 25 and, from there, via protocol-based communication interface 37 to communication manager 38 according to the present invention.

Communication manager 38 includes a software module 52 which is designed such that communication manager 38 may identify, based on "requests" data record 51 that was received, data generator 50 of "requests" data record 51, associated data recipient 53, and the particular communication medium. Based on this information, communication manager 38 automatically defines further communication route 54 to one or more internal and/or external network nodes 55, which will be described in greater detail, and which are also used to access one or more data recipients 53 according to the present invention. In this manner, it is made possible that "requests" data record 51 need not contain information about communication route 54 in bus system 25, thereby ensuring that particular data generator 50 must not have special knowledge of particular agricultural working machine 1 and bus system 25 assigned thereto; this results in smaller quantities of data to be transmitted, and in a more universal use of data generators 50.

In a subsequent communication step, particular data recipient 53 of "requests" data record 51 generates "response" data record 56; depending on the type of communication route 44, 45 of data generator 50 and the contents of "requests" data record 51, data recipient 53 is controlled on an internal or external communication route 44, 45, and it may be control devices 31, control and regulating device 23, and/or one or more external data processing devices 41. Once "response" data record 56 has been generated by data recipient 53, it functions as a data generator 57 and transmits "response" data record 56 via CAN bus system 25 and particular communication interface 37 to communication manager 38 according to the present invention. Its software module 52 now identifies data recipient 58 based on "response" data record 56, which is now original data generator 50 of "requests" data record 51. It is precisely data generator 50—e.g. external data processing device 41, a control device 31, or control and regulating device 23—which previously generated "requests" data record 51 that receives "response" data record 56.

In analogy to the transmission of "requests" data record 51, communication manager 38 also automatically defines—based on the information taken from "response" data record 56—the communication medium and communication route 54 from new data generator 57 to related data recipient 58 without particular "response" data record 56 including special information about the communication medium and the communication route to particular data recipient 58 which is original data generator 50. In this manner, the size of "response" data record 56 is kept small, thereby ensuring that data are transmitted rapidly.

Data generators 50 that define "requests" data record 51, and that, as data recipients 58, receive "response" data record 56, and data recipients 53 that receive "requests" data record 51 and, as data generators 57, also generate "response" data record 56, may be assigned internally and/or externally, as data processing devices 65, 66, to a mobile or stationary unit. An example of a mobile unit in this case is agricultural working machine 1 which is designed as combine harvester 2, or a mobile diagnostic system 46, while the stationary unit may be designed, e.g. as a centrally acting remote-diagnostic system 46. In the embodiment described here, data processing devices 65, 66 are control devices 31 and/or control and regulating device 23, and/or external data processing devices 41. Depending on "who" functions as data generator 50, 57, and "who" functions as data recipient 53, 58, various data processing devices 65, 66 are assigned internally or externally to the mobile or stationary device.

Figure 4:
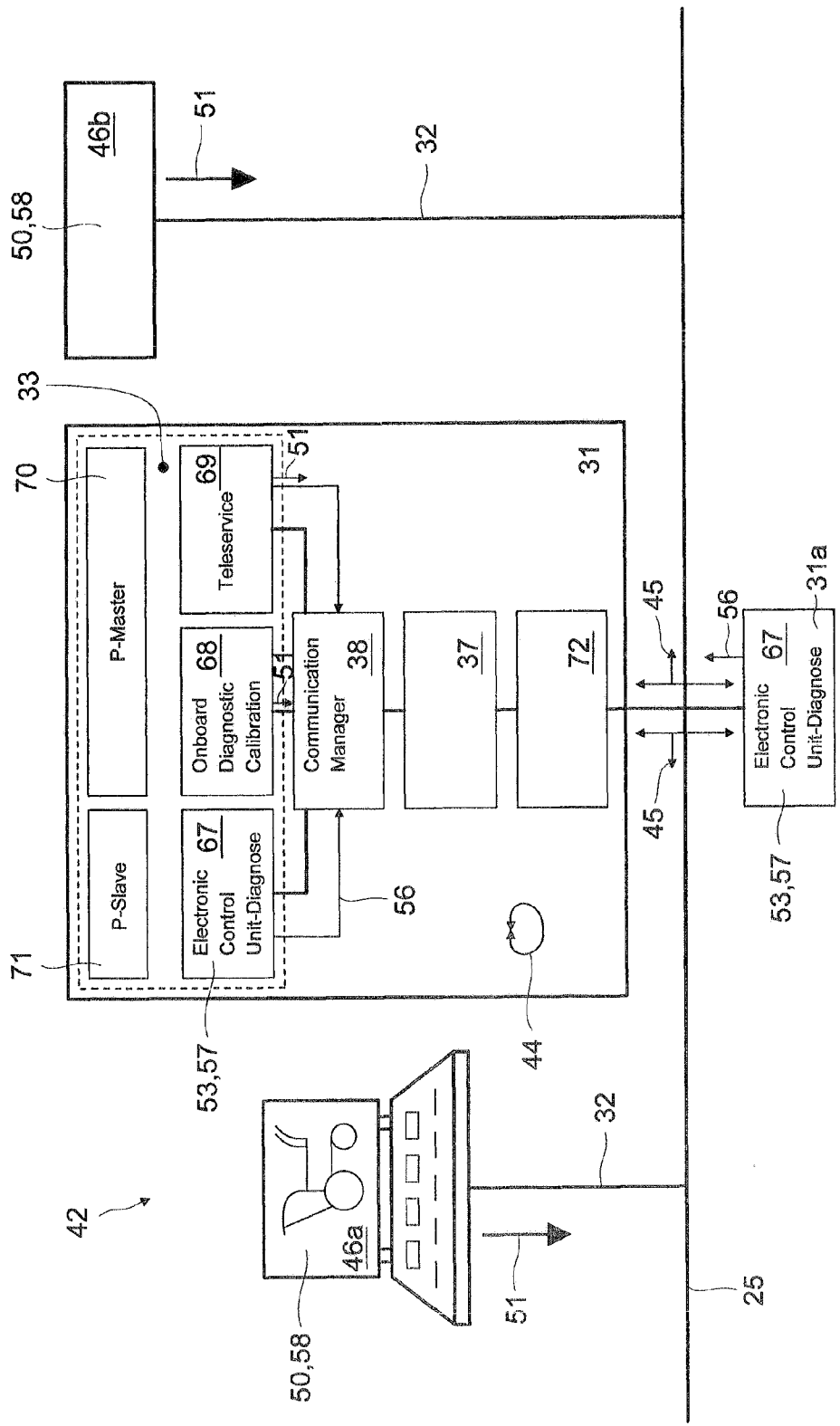
FIG. 4 is a schematic depiction of exemplary applications of the communication system according to the present invention

FIG. 4 is a schematic illustration of the operation of communication system 42 according to the present invention, using specific examples of communication. In analogy to FIG. 2, the following communicate with internal bus system 25: control devices 31, 31*a*, a diagnostic system 46*a* which is integrated in bus system 25 via a line system 32, and a further diagnostic system 46*b* which is preferably provided to perform remote diagnosis; connection 32 to internal bus system 25 is wireless. The schematic depiction of control device 31 in FIG. 4 was selected in order to visualize the communication structure. Software and hardware module 33 includes an electronic control unit 67, and on-board diagnostic and calibration module 68, and a teleservice module 69. In electronic control unit 67 it is possible to store and edit control and regulating characteristic curves for particular control device 31, and to call up malfunction information about particular control device 31. Using on-board diagnostic and calibration module 68, operator 24 of agricultural working machine 1 may generate, e.g. via control and regulating unit 23 shown in FIG. 2, "requests" data record 51 which, in this case, includes the request for malfunction information, the calibration of the control devices, and, associated therewith, the change of control and regulating characteristic curves stored in electronic control unit 67.

Teleservice module 69 also generates a "requests" data record 51 which includes data to be requested periodically, such as fuel consumption, engine capacity utilization, etc., wherein "requests" data record 51 is generated automatically by teleservice module 69 without any direct involvement by operator 24 of agricultural working machine 1. Given that "requests" data records 51 may only be generated via on-board diagnostic and calibration module 68 and teleservice module 69 of a control device 31, modules 68, 69 form the "protocol master", P master 70. Control unit 67—which generates "response" data record 56 according to the present invention—of a control device then forms "protocol slave", P slave 71. For simplicity, further control devices 31 are depicted symbolically in FIG. 4 as electronic control unit 67 of a further control device 31*a*.

In the manner according to the present invention, every control device 31 includes a communication manager 38 which controls the data exchange within a control device 31 on internal communication routes 44 and/or outside of a control device 31 on external communication routes 45 between control devices 31, 31*a* and various diagnostic systems 46*a*, 46*b*. As described above, communication interface 37, which includes communication manager 38, communicates according to a defined protocol, e.g. the keyword protocol. In addition, in a manner known per se, every control device includes a CAN bus driver 72 which enables communication by particular control device 31 with internal CAN bus system 25. Of the large number of possible examples of communication, the essential ones will be described below, as examples.

If the communication takes place between control devices 31, 31*a* and external diagnostic systems 46*a, b*, then external diagnostic systems 46*a, b* generate "requests" data records 51 which may include new software packages to be installed in order to adapt the control characteristic curves to individual control devices 31, and the error information query. "Requirements" data records 51 are transmitted via internal bus system 25 to control device(s) 31, 31*a*. In particular control device 31, communication manager 38 accepts "requests" data record 51, identifies—independently of the particular communication medium, e.g. data lines, telephone connection, radio—data generator 50 which is particular diagnostic system 46*a, b* in this case, and data recipient 53 which is electronic control unit 67 of particular control device 31 in this case. "Response" data record 56 is then generated in particular control device 31, 31*a*, which includes the requested error information or a confirmation that the software installation was successful. "Response" data record 56 is then transmitted via particular communication manager 38 to appropriate diagnostic system 46*a, b*. When "response" data record 56 is transmitted, former data generator 50 becomes data recipient 58, and former data recipient 53 becomes data generator 57.

Figure 5:
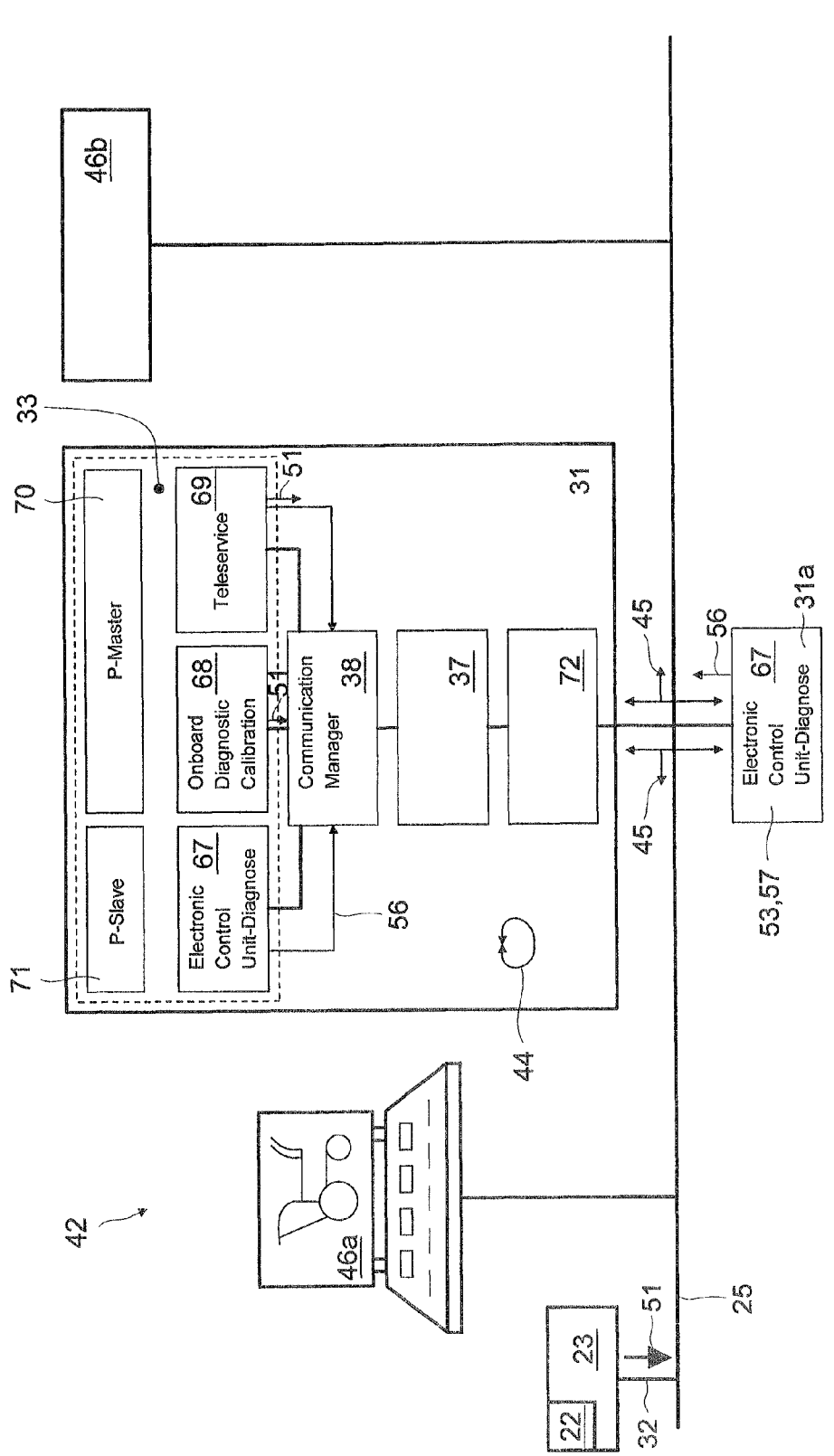
FIG. 5 is a schematic depiction of further exemplary applications of the communication system according to the present invention

A further application is illustrated in FIG. 5, when operator 24 of agricultural working machine 1 wants to call up malfunction information or the calibration of control devices 31 and, associated therewith, the change made to control and regulating characteristic curves that are stored in electronic control unit 67. Operator 24 of agricultural working machine 1 then generates "requests" data record 51, in the simplest case using control and regulating device 23 depicted in FIG. 2, which, in a manner analogous to the application described, is transmitted via particular communication manager 38 by on-board diagnostic and calibration module 68 to electronic control unit 67 of particular control device 31. Depending on whether control and regulating characteristic curves should be edited or whether error information should be called up, electronic control unit 67 generates "response" data record 56 which is then transmitted using communication manager 38 to on-board diagnostic and calibration module 68, and is visualized to operator 24 of agricultural working machine 1, e.g. via a display device 22 which is assigned to control and regulating device 23.

It is within the scope of the present invention for a display device (not depicted) to be assigned directly to a control device 31, thereby also enabling "response" data record 56 to be visualized directly in a control device 31. If on-board diagnostic and calibration module 68 should be used only to calibrate control devices 31, the communication may be structured such that "requests" data record 51 is transmitted by on-board diagnostic and calibration module 68 of a control device 31 to its communication manager 38, and further communication takes place exclusively via external communication routes 45 using on-board diagnostic and calibration modules 68 of further control devices 31a. An application of this type always results when the change or adaptation made to the control characteristic curves of a control device 31 affect the control characteristic curves of further control devices 31a.

A further application is the communication between teleservice module 69 and on-board diagnostic and calibration module 68 of the same control device 31 or on-board diagnostic and calibration modules 68 of further control devices 31a. This communication also takes place, as described above, when data that must be requested periodically or sporadically, such as fuel consumption or engine capacity utilization, must be obtained.

It will be understood that each of the elements described above, or two or more together, may also find a useful application in other types of constructions differing from the types described above.

While the invention has been illustrated and described as embodied in a communication system for exchanging data, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A communication system for exchanging data between data recipients and data generators, comprising
    a communication network via which a data exchange takes place between stationary and/or mobile units and/or within a stationary or mobile unit, said communication network connecting various communication media to one another;
    at least one communication manager assigned to said communication network and identifying a communication route of a data record between a particular data generator and an associated data recipient independently of a communication medium;
    a mobile unit configured as an agricultural working machine including a CAN bus system, wherein said communication manager is assigned to said mobile unit and controls the data exchange between data generators and data recipients within said CAN bus system and between said CAN bus system and external data generators and data recipients; and
    at least one control device including a software and hardware module which is directly connected to the CAN bus system via a first communication interface, said control device including at least one further communication interface that includes a communication manager which makes it possible for data to be exchanged between said CAN bus system and a software module of said software and hardware module of said control device in a protocol standard, as a bypass of said first communication interface.

2. The communication system for exchanging data between data recipients and data generators as defined in claim 1, wherein said communication manager is configured so that the data record containing information about the data generator, the data recipient, and the communication medium is readable by said communication manager, and said communication manager transmits the data record to a correct data recipient in an associated communication medium based on an information that was identified by said data generator.

3. The communication system for exchanging data between data recipients and data generators as defined in claim 1, wherein said data generator and said communication manager are configured so that said data generator becomes a data recipient, and so that the data recipient becomes the data generator on a communication route of a particular data record using said communication manager.

4. The communication system for exchanging data between data recipients and said data generators as defined in claim 1, further comprising a data processing device, which as the data generator defines a "requests" data record and transmits it to said communication manager via said communication network, and a further processing device with a network node via which said communication manager transmits the "requests" data record and which functions as the data recipient, wherein a "response" data record is generated in said further data processing device, while said further data processing device as said data generator transmits the "response" data record that was generated to the communication manager via the communication network, and the communication manager transmits a "response" data record to said first data processing device which now functions as the data recipient.

5. The communication system for exchanging data between data recipients and data generators as defined in claim 4, further comprising a control device, internal communication routes within said control device, external communication routes forming communication routes outside of said control device, so that the "requests" data record and the "response" data record in said communication network are transmitted along routes selected from the group consisting of the external communicating routes, internal communicating routes, and both.

6. The communication system for exchanging data between data recipients and data generators as defined in claim 5, wherein said internal and external communication routes are configured so that several data recipients that generate a "response" data record are reachable via a combination of said internal and external communication routes.

7. The communication system for exchanging data between data recipients and data generators as defined in claim 4, wherein the communication manager is configured so that the "requests" data record is transmitted using said communication manager to one or more data recipients, and the one or more data recipients generate a "response" data record.

8. The communication system for exchanging data between data recipients and data generators as defined in claim 1, further comprising a device selected from the group consisting of a control device, at least one control and input device, at least one diagnostic system, and a combination thereof and configured so that said data generators and data recipients which are assigned to said agricultural working machine and which are integrated in their CAN bus system are formed by said control devices, and wherein external data generators and data recipients are integratable in said CAN bus system.

9. The communication system for exchanging data between data recipients and data generators as defined in claim 8, wherein said external data generators and data recipients formed as external diagnostic systems are integratable in said CAN bus system.

10. The communication system for exchanging data between data recipients and data generators as defined in claim 1, wherein said software and hardware module of said control device includes a device selected from the group consisting of an electronic control unit, an on-board diagnostics and calibration module, a teleservice module, and a combination thereof, and said communication manager enables the data exchange between them via internal communication routes and between them and further control devices and diagnostic modules on external communication routes.

11. The communication system for exchanging data between data recipients and data generators as defined in claim 1, further comprising an electronic control unit in which control and regulating characteristic curves for the control device are stored in an editable manner, and malfunction information that relates to said control device is callable up from said electronic control unit; an on-board diagnostic and calibration module, so that using the on-board diagnostic and calibration module it is possible to request a malfunction information to calibrate the control devices and to change the control and regulating characteristic curves which are stored in said electronic control unit and so that data from one or more control devices are callable up using a teleservice module which submits the request automatically.

* * * * *